United States Patent [19]
Maki

[11] Patent Number: 4,903,813
[45] Date of Patent: Feb. 27, 1990

[54] CLUTCH DISK ASSEMBLY

[75] Inventor: Naoyuki Maki, Oaza-Tsuigome, Japan

[73] Assignee: Aisin Seiki Kabushiki Kaisha, Kariya, Japan

[21] Appl. No.: 250,747

[22] Filed: Sep. 29, 1988

[30] Foreign Application Priority Data

Sep. 30, 1987 [JP] Japan .................................. 62-246271

[51] Int. Cl.$^4$ ............................................. F16D 47/02
[52] U.S. Cl. .................................................. 192/106.2
[58] Field of Search .................... 192/70.17, 106.2; 464/64, 66, 68

[56] References Cited

U.S. PATENT DOCUMENTS

| | | | |
|---|---|---|---|
| 3,931,876 | 1/1976 | Beeskow et al. | 192/106.2 |
| 4,101,015 | 7/1978 | Radke | 464/64 |
| 4,471,863 | 9/1984 | Lech, Jr. | 464/68 |
| 4,591,348 | 5/1986 | Takeuchi et al. | 192/106.2 |

FOREIGN PATENT DOCUMENTS

| | | | |
|---|---|---|---|
| 0005533 | 1/1983 | Japan | 192/106.1 |
| 1094762 | 12/1967 | United Kingdom | 192/106.2 |
| 2042680 | 9/1980 | United Kingdom | 192/106.2 |

Primary Examiner—Rodney H. Bonck
Assistant Examiner—Nicholas Whitelaw
Attorney, Agent, or Firm—Burns, Doane, Swecker & Mathis

[57] ABSTRACT

A clutch disk assembly is provided with a continuous variable hysteresis mechanism which reduces noises or vibrations of the driving system. The continuous variable hysteresis mechanism includes a plate member, a spring member and a friction lining member between the hub member and the disk member. A cam face is provided on one of the plate member and/or spring member, a projection on one of the spring member and/or the plate member. An engaging mechanism is positioned between the plate member and the hub member and the continuous variable hysteresis is generated between the disk member and the hub member.

8 Claims, 5 Drawing Sheets

CLUTCH DISK ASSEMBLY

BACKGROUND OF THE INVENTION

1. Field of the Invention

The invention relates to a clutch disk assembly having a variable hysteresis mechanism for uses in an automotive vehicle, ship or the like.

2. Description of the Prior Art

A conventional clutch assembly has a variable hysteresis mechanism which changes the hysteresis at multiple stages of operation. However, a clutch assembly of this type has a flight or series of steps between a first hysteresis stage and a second hysteresis and is utilized in a driving system in which noises and vibrations are produced according to variations in engine torque. On the other hand, a traditional clutch disk assembly with a variable hysteresis mechanism is also known which changes the hysteresis in smooth non-stepwise action according to the change of a torsion angle.

As prior art, Japanese Patent Laid Open No. 58637(1983) is shown in FIGS. 7 and 8. In this conventional clutch disk assembly, a cam mechanism is disposed between the sub plate 75 and the thrust plate (control member) 77, and spring load is varied with the cam mechanism in response to the torsion angle. Namely, the torque-variation transmitted to the sub plate 75 is changed to an axial displacement through the cam mechanism (cam 75d and cam face 77d) and the axial displacement changes the load of cone spring 78, thereby increasing and decreasing the hysteresis.

However, in this mechanism, the spring load is always acting on the cam and, due to the sliding movement of the cam it is easily abraded. Further, the hysteresis is generated from a low level to a higher level by the variable hysteresis, so that when the cam is abraded, the load of the spring 78 changes. As a result, the stable hysteresis can not be obtained.

SUMMARY OF THE INVENTION

It is an object of the invention to provide a clutch disk assembly with a hysteresis mechanism which has a continuous variable hysteresis.

It is another object of the invention to provide a clutch disk assembly with a hysteresis mechanism in which a cam has improved wear characteristics.

It is yet another object of the invention to reduce noises or vibrations of the driving system which are produced in response to the torque variations of the engine.

In order to accomplish the objects, a clutch disk assembly according to the present invention is provided with a hub member, a disk member and a hysteresis mechanism which is disposed between the hub member and the disk member and which includes a plate member, a spring member and a friction lining member. The plate member has a space of a constant axial distance in which the spring member is positioned. A cam face is formed on the plate and/or the spring member, a projection on the spring member and/or the plate member contacts slidably with the cam face of plate member and/or the spring member, and an engaging mechanism is formed between the plate member and the hub member. When the hub member and the disk member twist relative to one another, the hysteresis mechanism provides a continuous variable hysteresis torque at a predetermined torsional angle.

BRIEF DESCRIPTION OF THE DRAWINGS

The above and other objects, features and advantages of the present invention will become fully apparent from the following description taken in conjunction with the accompanying drawings, in which.

DETAILED DESCRIPTION OF A PREFERRED EMBODIMENT OF THE INVENTION

Figure 1:
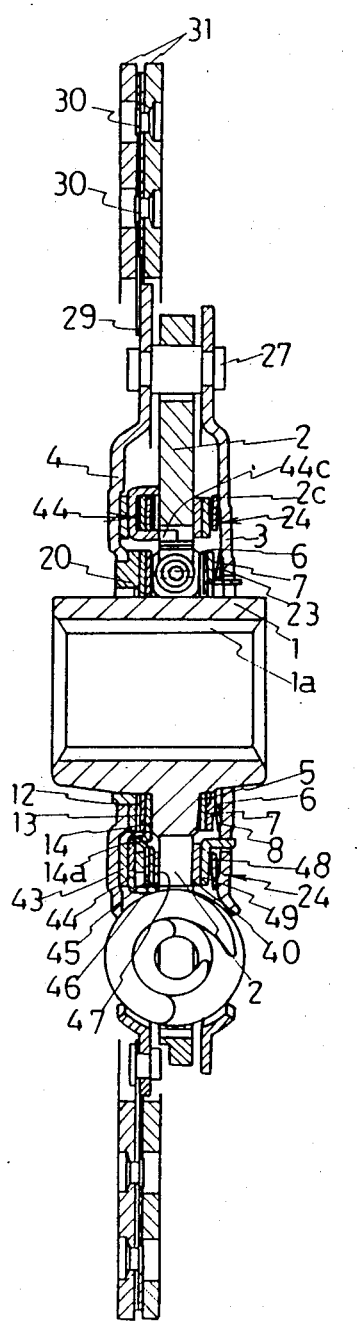
FIG. 1 is a sectional view of a clutch disk assembly of the invention taken along the line 1—1 in FIG. 2.

The clutch disk assembly comprises a hub 1 which is connected to an output shaft (not shown in the FIGS.) by a spline 1a. A hub flange 2 is coaxially engaged with the hub 1 by splines 1b and 2b and a disk plate 4 and a sub plate 3 are coaxially rotatably mounted on both sides of the hub 1. Hysteresis mechanisms 23, 24 are disposed between the disk plate 4, the sub plate 3 and the hub 1 and the hub flange 2. The splines 1b, 2b have a circumferential gap and rotate relatively through a predetermined angle. Between the hub 1 and the hub flange 2, a recess 33 is provided. In the recess 33, a torsion spring 17 is positioned through seats 16, 18. When the hub 1 and the hub flange 2 are relatively rotated, torque is transmitted from the hub flange 2 to the hub 1 through the torsion spring 17.

Facing plates 29 are fixed on the outer side of the disk plate 4, and friction pads 31 are fixed on both sides of the facing plates 29 by rivets 30. The disk plate 4 is integrally fixed to the sub plate 3 by pins 27. The hysteresis mechanism 23 is positioned between the hub 1 and the plates 3,4 while the hysteresis mechanism 24 is positioned between the hub flange 2 and the plates 3,4. A recess 2c is formed on an outer periphery of the hub flange 2, and the pin 27 is circumferentially rotatable across the extent of the recess 2c of the hub flange 2. In the hub flange 2, the disk plate 4 and the sub plate 3 are positioned relative to one another and connected by torsion springs 19, 25, 26 interposed in recesses provided in each plate.

The first hysteresis mechanism 23 includes a centering bushing 20, a thrust washer 12, a thrust lining 13 and a thrust washer 14 between the disk plate 4 and the hub 1. A cone spring 8, a thrust plate 7, a thrust lining 6 and a thrust washer 5 complete the first hysteresis mechanism by being positioned between the sub plate 3 and the hub 1.

The second hysteresis mechanism 24 includes a thrust lining 43, a cam plate 44, a cam spring 45, a thrust plate 46 and a thrust lining 47 between the disk plate 4 and the hub flange 2. Between the plate 3 and the hub flange 2, a cone spring 48, a thrust plate 49 and a thrust lining 40 complete the second hysteresis mechanism.

Figure 6:
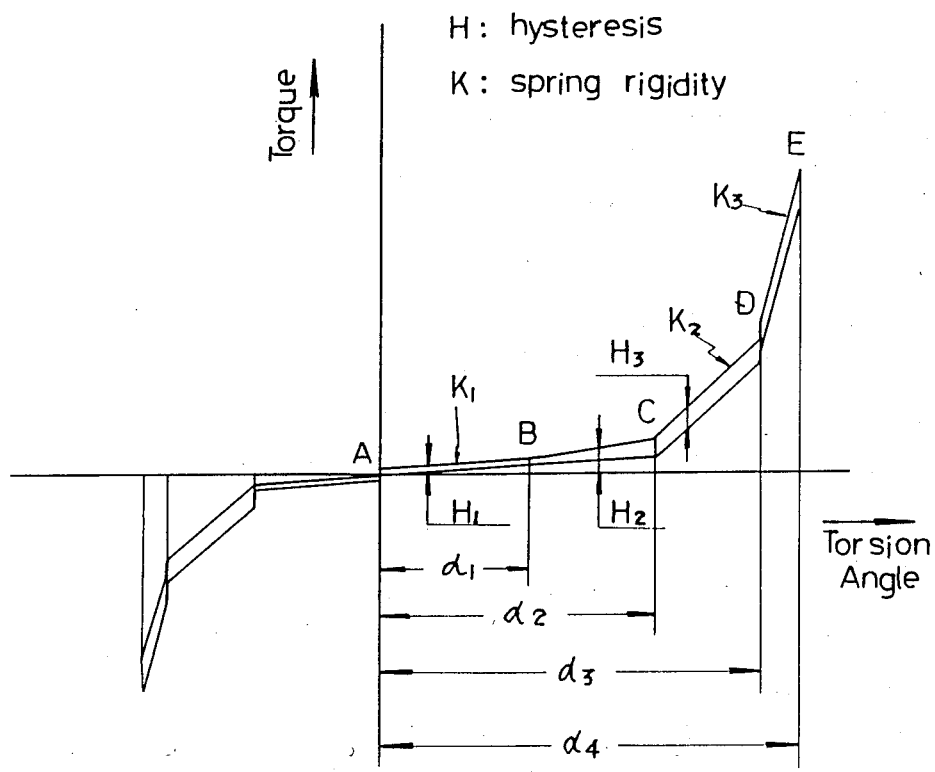
FIG. 6 is a graph of the hysteresis operation of the clutch disk assembly of the invention.
Figures 7, 8:
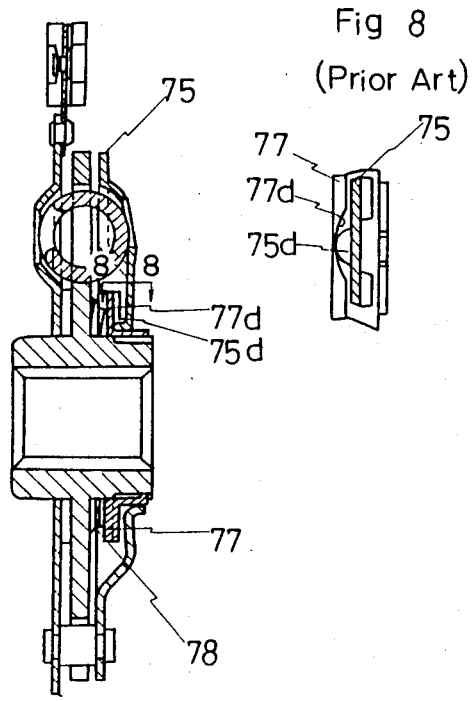
FIG. 7 is a sectional view of a conventional clutch disk assembly.
FIG. 8 is a sectional view of the conventional clutch disk assembly taken along the line 8—8 in FIG. 7.

The first hysteresis mechanism 23 determines the hysteresis in the range of the torsion angle from A to B in FIG. 6, and the second hysteresis mechanism 24 determines the hysteresis in the range of the torsion angle from B to E in FIG. 6. A continuous variable hysteresis in proportion to the torsion angle is shown at H2 in FIG. 6.

Figure 3:
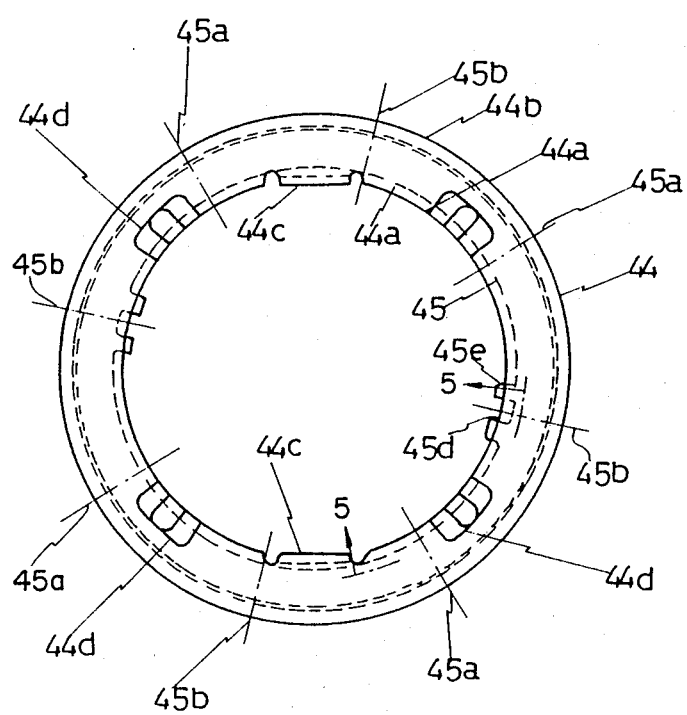
FIG. 3 is a front view of a cam mechanism of the invention.
Figure 4:
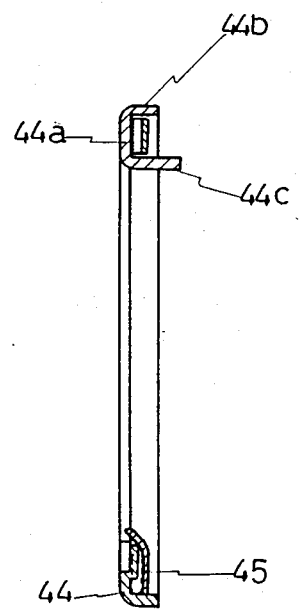
FIG. 4 is a sectional view of a cam mechanism in FIG. 3.
Figure 5:
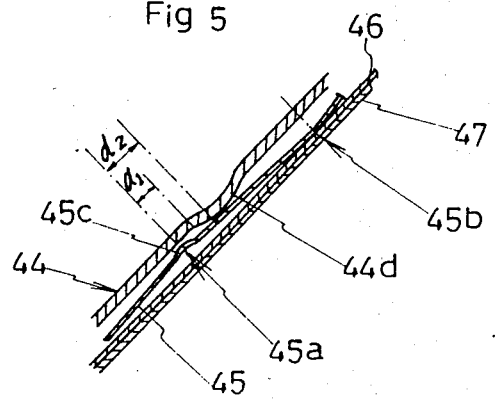
FIG. 5 is a sectional view of a cam mechanism taken along the line 5—5 in FIG. 3.

The cam plate 44, which may be formed by an axial pressing process, has a ring shaped flat part 44a, a flange part 44b and protrusions 44c. The flange part 44b is in substantially cylindrical form at an outer peripheral edge of the flat part 44a. The protrusions 44c are formed axially along an inner side of the part 44a. The protrusions 44c are fixedly inserted in the recesses 2d, formed in the hub 2. Therefore, the cam plate 44 is circumferentially fixed to the hub flange 2 through the protrusions 44c. On the flat part 44a, four cam faces 44d are circumferentially formed at equal intervals. Each cam face 44d is trapezoid-shaped and projects into contact with the cam spring 45. The cam spring 45 is interposed in the space between the flange part 44b and the protrusions 44c. The cam spring 45 is a ring shaped leaf spring and has, at circumferentially equal intervals mutual tops or raised portions 45a and roots 45b (shown by center lines in FIG. 3) in a substantially undulating form. The tops or raised portions 45a extend toward the cam plate 44 and have curved projections 45c extending across the end of the tops 45a. As shown in FIGS. 4 and 5, the cam spring 45 is positioned interiorly of the cylindrical cam plate 44 such that the side of the curve projection 45c is contactable with the cam plate 44 and the rear or opposite side of the curved projection is contactable with the thrust plate 46 which is connected circumferentially to the cam spring 45 through a recess 45d. The thrust lining 47 is interposed between the thrust plate 46 and the hub flange 2. A projection 14a of the thrust washer 14 of the hysteresis mechanism 23 is engaged with forked projections 45e through the recess 45d. The thrust washer 14 is circumferentially fixed to the hub 1. The amount of hysteresis which is generated between two cam faces of the curved projection 45c, through the thrust lining 47, is controlled by the spring constant coefficient, amount of the deflection (according to the shape of the cam face), and the like of the spring 45.

Figure 2:
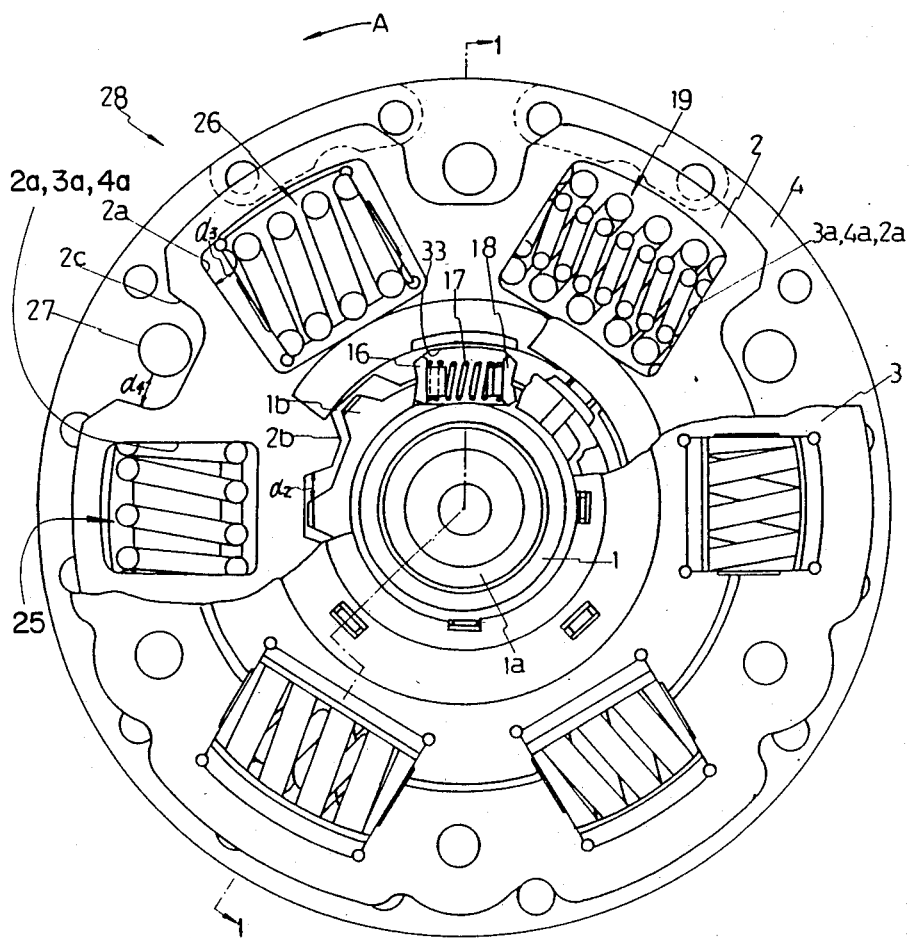
FIG. 2 is a front view and a partially cut-out section of a clutch disk assembly of the invention.

The torque of the plates 3, 4 in the direction A in FIG. 2 is transmitted to the centering bushing 20, the thrust plate 7, and to the thrust linings 13 and 6. In accordance with the first hysteresis mechanism 23, the hysteresis torque H1 is shown in FIG. 6. When the amount of the input torque is over the point A, plates 3,4 are slidably moved relative to the hub 1. At this time, torque is transmitted to the hub flange 2 through the plates 3,4 and the hysteresis mechanism 24, and is further transmitted to the seat 18 through the spline 2b to compress the spring 17. In this compressing process the first spring constant coefficient k1 is determined according to the spring constant coefficient of the spring 17. The cam spring 45 is fixed to the hub 1 through the thrust washer 14. The cam plate 4, which is engaged with the hub flange 2, is rotated with the hub flange 2. The cam plate 44 is moved through an angle d1 and the cam face 44d is contacted with the curve portion 45c. After this condition, the cam spring 45 begins a deflection process. In this deflection process, the cam face 44d presses the curve projection 45c, therefore, the cam spring 45 deflects and spring load is created in relation with the amount of the deflection. This amount of the deflection increases in relation with the torsion angle according to the cam operation, therefore, the spring-load increases in relation to the torsion angle. The hysteresis H2 according to the spring-load occurs between the hub flange 2 and the thrust lining 47 and increases in relation to the torsion angle (shown between B and C in FIG. 6). The cam plate 44 is moved to angle d2 and the curve projection 45c contacts with the bottom of the cam face 44d. At this time, the deflection becomes maximum and the hysteresis torque is shown at H3 (point C). In this position, the spline 1b of the hub 1 is engaged with the spline 2b of the hub flange 2. When the input torque increases over the point C, the plates 3, 4 are slidably moved relative to the hub flange 2, and the input torque is transmitted to the springs 19, 25 through the recesses 3a, 4a of the plates 3, 4 and compresses the springs 19, 25. In this compression process (d3), the second characteristic shows K2 according to the rigidity of the springs 19, 25. At the end of this process, one end of the spring 26 in is contact with the recess 2a of the hub flange 2 and, therefore, the input torque is transmitted to the hub 2 through the recess 2a. The spring 26 is positioned in the recesses 4a, 3a with a predetermined compression therefore, the hysteresis torque increases to point D. Thereafter, the third characteristic shows K3 according to the spring constant coefficient of the spring 26. At the end of the compression process d4, the pin 27 is contacted with a side of recess 2c of the hub flange 2. Then, input torque is transmitted to the hub flange 2 through the pin 27 and the plates 3, 4 are integrally rotated with the hub flanges 1, 2.

The cam mechanism of the invention can be positioned adjacent the next space (in the cylindrical plate part) independently from the known hysteresis mechanism and, therefore, the cam mechanism permits continuous variable hysteresis torque in proportion to the torsion angle across a predetermined angle range.

The wave leaf spring can easily provide the hysteresis characteristic curve according to a class of vehicles, and partially the continuous variable hysteresis characteristic curve.

Changes of the form of the cam face with respect to the spring member and to the plate member or of the spring constant coefficient of the spring member can provide a choice in the amount of the hysteresis developed.

Although the invention has been described in its preferred form with a certain degree of particularity, obviously many changes and variations are possible therein. It is therefore to be understood that the present invention may be practiced otherwise than specifically described herein without departing from the scope and spirit thereof.

What is claimed is:

1. A torque transmitting clutch disk assembly comprising:
   hub means including a hub member and a hub flange extending radially of said hub member, said hub flange being arranged for limited rotation relative to said hub member;
   spring means acting circumferentially between said hub member and said hub flange;
   disk means coaxially and rotatably mounted to said hub member and disposed axially adjacent said hub flange;
   a first hysteresis mechanism axially resiliently arranged between said disk means and said hub member; and a second hysteresis mechanism axially resiliently arranged between said disk means and said hub flange, said second hysteresis mechanism including independently operable first and second hysteresis portions, said second hysteresis portion generating a continuously variable hysteresis and comprising:

a plate member, a spring member and a friction lining member, said plate member provided with an axially open recess in which said spring member is positioned;

a cam face formed on one of said plate member and said spring member;

a projection formed on the other of said spring member and plate member and slidably contacting with said cam face; and an engaging member provided between said plate member and said hub member.

2. A clutch disk assembly according to claim 1, further comprising:

an outer side edge of said plate member being of substantially cylindrical shape; and said recess provided in an inner portion of said outer side edge.

3. A clutch disk assembly according to claim 1, wherein;

said cam face is formed on said plate member, and said projection slidably contacting said cam face is formed on said spring member.

4. A clutch disk assembly according to claim 2, further comprising:

said cam face is formed on said plate member, and said projection slidably contacting said cam face is formed on said spring member.

5. A clutch disk assembly according to claim 3, wherein said spring member is a wave leaf spring.

6. Clutch disk assembly according to claim 4, wherein said spring member is a wave leaf spring.

7. A clutch disk assembly according to claim 1, wherein said disk means comprises a disk plate and a sub plate disposed on opposite sides of said hub flange, said first hysteresis mechanism being disposed between said sub plate and said hub flange, and said second hysteresis portion disposed between said disk plate and said hub flange.

8. A clutch disk assembly according to claim 1, wherein each of said first hysteresis mechanism and said first hysteresis portion produces a generally constant hysteresis.

* * * * *